US008271881B2

(12) United States Patent
Moorer et al.

(10) Patent No.: US 8,271,881 B2
(45) Date of Patent: *Sep. 18, 2012

(54) TOUCH SCREEN FOR CONVERGENCE AND AUTOMATION SYSTEM

(75) Inventors: Seal Moorer, Naples, FL (US); Eric Eichensehr, Galena, OH (US); William K. Virgin, Blacklick, OH (US); Joesph Lehman, New Albany, OH (US)

(73) Assignee: Exceptional Innovation, LLC, Westerville, OH (US)

(*) Notice: Subject to any disclaimer, the term of this patent is extended or adjusted under 35 U.S.C. 154(b) by 244 days.

This patent is subject to a terminal disclaimer.

(21) Appl. No.: 11/738,305

(22) Filed: Apr. 20, 2007

(65) Prior Publication Data
US 2007/0288849 A1    Dec. 13, 2007

Related U.S. Application Data

(60) Provisional application No. 60/793,257, filed on Apr. 20, 2006.

(51) Int. Cl.
*G06F 15/177* (2006.01)
(52) U.S. Cl. ......... 715/737; 715/736; 709/223; 709/224
(58) Field of Classification Search .................. 715/736, 715/737; 345/173; 709/223, 246, 224
See application file for complete search history.

(56) References Cited

U.S. PATENT DOCUMENTS

| 4,567,557 A | 1/1986 | Burns |
| 4,808,841 A | 2/1989 | Ito et al. |
| 4,989,081 A | 1/1991 | Miyagawa |
| 5,086,385 A | 2/1992 | Launey et al. |
| 5,105,186 A | 4/1992 | May |
| 5,218,552 A | 6/1993 | Stirk |
| 5,237,305 A | 8/1993 | Ishijuro |
| 5,282,028 A | 1/1994 | Johnson et al. |
| 5,502,618 A | 3/1996 | Chiou |
| 5,565,894 A * | 10/1996 | Bates et al. .................. 345/178 |
| 5,579,221 A | 11/1996 | Mun |
| 5,598,523 A | 1/1997 | Fujita |
| 5,621,662 A | 4/1997 | Humphries et al. |
| 5,623,392 A | 4/1997 | Ma |
| 5,666,172 A | 9/1997 | Ida et al. |
| 5,706,191 A | 1/1998 | Bassett et al. |
| 5,706,290 A | 1/1998 | Shaw et al. |
| 5,748,444 A | 5/1998 | Honda et al. |
| 5,787,259 A | 7/1998 | Haroun |
| 5,831,823 A | 11/1998 | Hoedl |
| 5,850,340 A | 12/1998 | York |
| 5,877,957 A | 3/1999 | Bennett |

(Continued)

OTHER PUBLICATIONS

Fred Halsall; Data Communications, Computer Networks and Open Systems; 1996; Addison-Wesley Publishers Ltd.;Fourth Edition; pp. 15,18.*

*Primary Examiner* — Phenuel Salomon
(74) *Attorney, Agent, or Firm* — Baker & Hostetler, LLP

(57) ABSTRACT

An automation system operating in a Web Service for Devices environment includes clients and devices, a network comprising a server configured to be connected to the clients and devices with the web services for devices, and a touch screen device coupled to the network and provided a user interface for controlling the devices. The clients and devices are configured with a web services for devices stack protocol to provide automation-based control and communication between the clients and devices.

20 Claims, 10 Drawing Sheets

U.S. PATENT DOCUMENTS

| | | | |
|---|---|---|---|
| 5,922,047 | A | 7/1999 | Newlin et al. |
| 5,956,025 | A | 9/1999 | Goulden et al. |
| 5,956,487 | A * | 9/1999 | Venkatraman et al. ........ 709/218 |
| 6,020,881 | A | 2/2000 | Naughton et al. |
| 6,029,092 | A | 2/2000 | Stein |
| 6,061,602 | A | 5/2000 | Meyer |
| 6,112,127 | A | 8/2000 | Bennett |
| 6,139,177 | A | 10/2000 | Venkatraman et al. |
| 6,147,601 | A | 11/2000 | Sandelman et al. |
| 6,154,681 | A | 11/2000 | Drees et al. |
| 6,160,477 | A | 12/2000 | Sandelman et al. |
| 6,175,872 | B1 | 1/2001 | Neumann et al. |
| 6,182,094 | B1 | 1/2001 | Humpleman et al. |
| 6,192,282 | B1 | 2/2001 | Smith et al. |
| 6,198,479 | B1 | 3/2001 | Humpleman et al. |
| 6,201,523 | B1 | 3/2001 | Akiyama et al. |
| 6,222,729 | B1 | 4/2001 | Yoshikawa |
| 6,243,707 | B1 | 6/2001 | Humpleman et al. |
| 6,263,260 | B1 | 7/2001 | Bodmer et al. |
| 6,268,857 | B1 * | 7/2001 | Fishkin et al. ................ 715/863 |
| 6,275,922 | B1 | 8/2001 | Bertsch |
| 6,278,676 | B1 | 8/2001 | Anderson et al. |
| 6,288,716 | B1 | 9/2001 | Humpleman et al. |
| 6,313,990 | B1 | 11/2001 | Cheon |
| 6,314,326 | B1 | 11/2001 | Fuchu |
| 6,353,853 | B1 | 3/2002 | Gravlin |
| 6,385,495 | B1 | 5/2002 | Bennett |
| 6,389,331 | B1 | 5/2002 | Jensen et al. |
| 6,402,109 | B1 | 6/2002 | Dittmer |
| 6,405,103 | B1 | 6/2002 | Ryan et al. |
| 6,456,892 | B1 | 9/2002 | Dara-Abrams et al. |
| 6,462,654 | B1 | 10/2002 | Sandelman et al. |
| 6,473,661 | B1 | 10/2002 | Wollner |
| 6,496,575 | B1 | 12/2002 | Vasell et al. |
| 6,522,346 | B1 | 2/2003 | Meyer |
| 6,523,696 | B1 | 2/2003 | Saito et al. |
| 6,526,581 | B1 | 2/2003 | Edson |
| 6,546,419 | B1 | 4/2003 | Humpleman |
| 6,580,950 | B1 | 6/2003 | Johnson et al. |
| 6,587,739 | B1 | 7/2003 | Abrams et al. |
| 6,609,038 | B1 | 8/2003 | Croswell et al. |
| 6,615,088 | B1 | 9/2003 | Myer et al. |
| 6,633,781 | B1 | 10/2003 | Lee et al. |
| 6,640,141 | B2 | 10/2003 | Bennett |
| 6,663,781 | B1 | 12/2003 | Huling |
| 6,690,411 | B2 | 2/2004 | Naidoo et al. |
| 6,690,979 | B1 | 2/2004 | Smith |
| 6,735,619 | B1 | 5/2004 | Sawada |
| 6,756,998 | B1 | 6/2004 | Bilger |
| 6,763,040 | B1 | 7/2004 | Hite et al. |
| 6,778,868 | B2 | 8/2004 | Imamura et al. |
| 6,782,294 | B2 | 8/2004 | Reich et al. |
| 6,792,319 | B1 | 9/2004 | Bilger |
| 6,792,323 | B2 | 9/2004 | Krzyzanowski et al. |
| 6,792,480 | B2 | 9/2004 | Chaiken et al. |
| 6,823,223 | B2 | 11/2004 | Gonzales et al. |
| 6,834,208 | B2 | 12/2004 | Gonzales et al. |
| 6,838,978 | B2 | 1/2005 | Aizu et al. |
| 6,845,275 | B2 | 1/2005 | Gasiorek et al. |
| 6,850,149 | B2 | 2/2005 | Park |
| 6,859,669 | B2 | 2/2005 | An |
| 6,865,428 | B2 | 3/2005 | Gonzales et al. |
| 6,868,292 | B2 | 3/2005 | Ficco |
| 6,868,293 | B1 | 3/2005 | Schurr et al. |
| 6,870,555 | B2 | 3/2005 | Sekiguchi |
| 6,891,838 | B1 | 5/2005 | Petite et al. |
| 6,909,921 | B1 | 6/2005 | Bilger |
| 6,912,429 | B1 | 6/2005 | Bilger |
| 6,924,727 | B2 | 8/2005 | Nagaoka et al. |
| 6,928,576 | B2 | 8/2005 | Sekiguchi |
| 6,930,599 | B2 | 8/2005 | Naidoo et al. |
| 6,957,110 | B2 | 10/2005 | Wewalaarachchi et al. |
| 6,957,275 | B1 | 10/2005 | Sekiguchi |
| 6,961,763 | B1 | 11/2005 | Wang et al. |
| 6,965,935 | B2 | 11/2005 | Diong |
| 6,967,565 | B2 | 11/2005 | Lingemann |
| 6,980,868 | B2 | 12/2005 | Huang et al. |
| 6,990,379 | B2 | 1/2006 | Gonzales et al. |
| 7,047,092 | B2 | 5/2006 | Wimsatt |
| 7,130,719 | B2 | 10/2006 | Ehlers et al. |
| 7,136,709 | B2 | 11/2006 | Arling |
| 7,170,422 | B2 | 1/2007 | Nelson et al. |
| 7,174,385 | B2 | 2/2007 | Li |
| 7,200,683 | B1 * | 4/2007 | Wang et al. ................... 709/250 |
| 7,201,356 | B2 | 4/2007 | Huang |
| 7,203,486 | B2 | 4/2007 | Patel |
| 7,225,037 | B2 | 5/2007 | Shani |
| 7,260,604 | B2 | 8/2007 | Kuki |
| 7,366,752 | B2 * | 4/2008 | Stawikowski et al. ........ 709/202 |
| 7,370,280 | B2 | 5/2008 | Ho et al. |
| 7,380,250 | B2 | 5/2008 | Schechter et al. |
| 7,453,685 | B2 | 11/2008 | Lube |
| 7,505,889 | B2 | 3/2009 | Salmonsen |
| 7,581,231 | B2 * | 8/2009 | Smith et al. .................... 719/328 |
| 2001/0034754 | A1 | 10/2001 | Elwahab et al. |
| 2001/0036192 | A1 | 11/2001 | Chiles et al. |
| 2001/0039460 | A1 | 11/2001 | Aisa |
| 2002/0000092 | A1 | 1/2002 | Sharood et al. |
| 2002/0016639 | A1 | 2/2002 | Smith et al. |
| 2002/0029085 | A1 | 3/2002 | Park |
| 2002/0031120 | A1 | 3/2002 | Rakib |
| 2002/0033760 | A1 | 3/2002 | Kobayashi |
| 2002/0035404 | A1 | 3/2002 | Ficco et al. |
| 2002/0044042 | A1 | 4/2002 | Christensen |
| 2002/0047774 | A1 | 4/2002 | Christensen |
| 2002/0073183 | A1 * | 6/2002 | Yoon et al. .................... 709/220 |
| 2002/0111698 | A1 | 8/2002 | Graziano et al. |
| 2002/0126443 | A1 | 9/2002 | Zodnik |
| 2002/0152311 | A1 | 10/2002 | Veltman et al. |
| 2002/0165953 | A1 | 11/2002 | Diong |
| 2002/0174178 | A1 * | 11/2002 | Stawikowski ................. 709/203 |
| 2002/0180579 | A1 | 12/2002 | Nagaoka et al. |
| 2002/0194328 | A1 | 12/2002 | Hallenbeck |
| 2002/0196158 | A1 | 12/2002 | Lee |
| 2003/0009515 | A1 | 1/2003 | Lee et al. |
| 2003/0009537 | A1 | 1/2003 | Wang |
| 2003/0028270 | A1 | 2/2003 | Peterson et al. |
| 2003/0033028 | A1 | 2/2003 | Bennett |
| 2003/0034898 | A1 | 2/2003 | Shamoon et al. |
| 2003/0037166 | A1 | 2/2003 | Ueno et al. |
| 2003/0040812 | A1 | 2/2003 | Gonzales et al. |
| 2003/0040813 | A1 | 2/2003 | Gonzales et al. |
| 2003/0040819 | A1 | 2/2003 | Gonzales |
| 2003/0065407 | A1 | 4/2003 | Johnson et al. |
| 2003/0069887 | A1 | 4/2003 | Lucovsky et al. |
| 2003/0074088 | A1 | 4/2003 | Gonzales |
| 2003/0083758 | A1 | 5/2003 | Williamson |
| 2003/0101304 | A1 | 5/2003 | King et al. |
| 2003/0103088 | A1 * | 6/2003 | Dresti et al. ................... 345/835 |
| 2003/0198938 | A1 | 10/2003 | Murray |
| 2003/0200009 | A1 | 10/2003 | von Kannewurff |
| 2003/0233432 | A1 | 12/2003 | Davis et al. |
| 2004/0003051 | A1 | 1/2004 | Krzyzanowski et al. |
| 2004/0004810 | A1 | 1/2004 | Kim |
| 2004/0010327 | A1 | 1/2004 | Terashima et al. |
| 2004/0010561 | A1 | 1/2004 | Kim |
| 2004/0039459 | A1 | 2/2004 | Daugherty et al. |
| 2004/0092282 | A1 | 5/2004 | Kim et al. |
| 2004/0133314 | A1 | 7/2004 | Ehlers |
| 2004/0138768 | A1 | 7/2004 | Murray |
| 2004/0143629 | A1 | 7/2004 | Bodin et al. |
| 2004/0176877 | A1 | 9/2004 | Hesse |
| 2004/0213384 | A1 | 10/2004 | Alles |
| 2004/0215694 | A1 | 10/2004 | Podolsky |
| 2004/0215778 | A1 | 10/2004 | Hesse et al. |
| 2004/0215816 | A1 | 10/2004 | Hayes et al. |
| 2004/0237107 | A1 | 11/2004 | Staples |
| 2004/0243257 | A1 | 12/2004 | Theimer |
| 2004/0249922 | A1 | 12/2004 | Hackman |
| 2004/0260407 | A1 | 12/2004 | Wimsatt |
| 2004/0260427 | A1 | 12/2004 | Wimsatt |
| 2004/0266439 | A1 | 12/2004 | Lynch et al. |
| 2004/0267385 | A1 | 12/2004 | Lingemann |
| 2004/0267876 | A1 * | 12/2004 | Kakivaya et al. .............. 709/200 |
| 2004/0267909 | A1 | 12/2004 | Autret |
| 2005/0009498 | A1 | 1/2005 | Ho |
| 2005/0021805 | A1 | 1/2005 | Petris |

| | | | | | | |
|---|---|---|---|---|---|---|
| 2005/0035717 A1 | 2/2005 | Adamson | | 2005/0232583 A1 | 10/2005 | Kubota |
| 2005/0038708 A1* | 2/2005 | Wu ................................ 705/26 | | 2005/0262227 A1 | 11/2005 | Heller et al. |
| 2005/0044225 A1* | 2/2005 | Ota et al. ...................... 709/225 | | 2005/0267605 A1 | 12/2005 | Lee et al. |
| 2005/0055108 A1 | 3/2005 | Gonzales | | 2005/0271355 A1 | 12/2005 | Gilor |
| 2005/0071419 A1 | 3/2005 | Lewontin | | 2006/0004920 A1 | 1/2006 | Hallenbeck |
| 2005/0080879 A1 | 4/2005 | Kim et al. | | 2006/0009861 A1 | 1/2006 | Bonasia et al. |
| 2005/0085930 A1 | 4/2005 | Gonzales | | 2006/0020353 A1 | 1/2006 | Gonzales et al. |
| 2005/0090915 A1 | 4/2005 | Geiwitz | | 2006/0053234 A1 | 3/2006 | Kumar et al. |
| 2005/0096753 A1 | 5/2005 | Arling et al. | | 2006/0058900 A1 | 3/2006 | Johanson et al. |
| 2005/0107897 A1 | 5/2005 | Callaghan | | 2006/0069934 A1 | 3/2006 | Esch et al. |
| 2005/0108091 A1 | 5/2005 | Sotak | | 2006/0106933 A1 | 5/2006 | Huang et al. |
| 2005/0113021 A1 | 5/2005 | Gosieski, Jr. et al. | | 2006/0118694 A1 | 6/2006 | Lee et al. |
| 2005/0113943 A1 | 5/2005 | Nian | | 2006/0126646 A1 | 6/2006 | Bedingfield, Sr. |
| 2005/0119767 A1 | 6/2005 | Kiwimagi et al. | | 2006/0155802 A1 | 7/2006 | He et al. |
| 2005/0119793 A1 | 6/2005 | Amundson et al. | | 2006/0190580 A1* | 8/2006 | Shu et al. ...................... 709/223 |
| 2005/0125083 A1 | 6/2005 | Kiko | | 2007/0053376 A1 | 3/2007 | Oshima et al. |
| 2005/0131551 A1 | 6/2005 | Ruutu | | 2007/0073419 A1 | 3/2007 | Sesay |
| 2005/0131553 A1 | 6/2005 | Yoon et al. | | 2007/0083679 A1 | 4/2007 | Kikuchi |
| 2005/0131558 A1 | 6/2005 | Braithwaite | | 2007/0104332 A1 | 5/2007 | Clemens et al. |
| 2005/0132405 A1 | 6/2005 | AbiEzzi | | 2007/0153459 A1 | 7/2007 | Wohlford et al. |
| 2005/0149758 A1 | 7/2005 | Park | | 2007/0162567 A1 | 7/2007 | Ding |
| 2005/0159823 A1 | 7/2005 | Hayes et al. | | 2007/0247800 A1 | 10/2007 | Smith et al. |
| 2005/0198063 A1 | 9/2005 | Thomas et al. | | 2008/0108439 A1 | 5/2008 | Cole |
| 2005/0198188 A1 | 9/2005 | Hickman | | | | |
| 2005/0198304 A1* | 9/2005 | Oliver et al. ................ 709/227 | | * cited by examiner | | |

TOUCH SCREEN FOR CONVERGENCE AND AUTOMATION SYSTEM

CROSS REFERENCE TO RELATED APPLICATIONS

This application claims priority to and the benefit of Provisional Patent Application No. 60/793,257 filed on Apr. 20, 2006, entitled TOUCH SCREEN FOR USE WITH AUTOMATION SYSTEMS, to Seale MOORER, et al., which is hereby expressly incorporated by reference for all purposes as if fully set forth herein.

Further, this application is related to the following U.S. patent applications: U.S. patent application Ser. No. 11/686,826, entitled NETWORK BASED DIGITAL ACCESS POINT DEVICE, filed Mar. 15, 2007, to Seale Moorer, et al.; U.S. patent application Ser. No. 11/686,836, entitled INTERNET PROTOCOL BASED MEDIA STREAMING SOLUTION, filed Mar. 15, 2007, to Seale Moorer, et al.; U.S. patent application Ser. No. 11/686,896, entitled AUTOMATION CONTROL SYSTEM HAVING A CONFIGURATION TOOL AND TWO-WAY ETHERNET COMMUNICATION FOR WEB SERVICE MESSAGING, DISCOVERY, DESCRIPTION, AND EVENTING THAT IS CONTROLLABLE WITH A TOUCH-SCREEN DISPLAY, filed Mar. 15, 2007 and issued Mar. 24, 2009 as U.S. Pat. No. 7,509,402 to Seale Moorer, et al.; U.S. patent application Ser. No. 11/686,884, entitled AUTOMATION CONTROL SYSTEM HAVING DIGITAL LOGGING, filed Mar. 15, 2007 and issued Feb. 24, 2009 as U.S. Pat. No. 7,496,627 to Seale Moorer, et al.; U.S. patent application Ser. No. 11/686,893, entitled USER CONTROL INTERFACE FOR CONVERGENCE AND AUTOMATION SYSTEM, filed Mar. 15, 2007, to Seale Moorer, et al.; U.S. patent application Ser. No. 11/686,846, entitled DEVICE AUTOMATION USING NETWORKED DEVICE CONTROL HAVING A WEB SERVICES FOR DEVICES STACK, filed Mar. 15, 2007 and issued Sep. 8, 2009 as U.S. Pat. No. 7,587,464 to Seale Moorer, et al.; U.S. patent application Ser. No. 11/686,875, entitled AUTOMATION CONTROL SYSTEM HAVING A CONFIGURATION TOOL, filed Mar. 15, 2007, to Seale Moorer, et al.; and U.S. patent application Ser. No. 11/686,889, entitled AUTOMATION CONTROL SYSTEM HAVING DEVICE SCRIPTING, filed Mar. 15, 2007, to Seale Moorer, et al., now U.S. Pat. No. 7,966,083 issued Jun. 21, 2011, which are all hereby expressly incorporated by reference for all purposes as if fully set forth herein.

BACKGROUND OF THE INVENTION

1. Field of the Invention

The invention is directed to multiple device control and convergence that includes a touch screen device, and more particularly to multiple device addressing, discovery, description, control, eventing, and convergence in a Web Service environment, and control through a touch screen input device.

2. Related Art

Household, academic and/or business spaces now more commonly have more than one audio or video device such as CD/DVD player, portable MP3 player, tuner, preamp, power amp, speakers, VCR, DVR, computers running media players or connected to some other source of audio or video (e.g., Internet radio, satellite radio and the like), set top boxes (STB), etc. Typically, a CD/DVD player from one company comes with its own remote control and an amplifier by an entirely different company comes with its own remote control. The same space may have a PC with its keyboard and mouse, and yet another company's portable MP3 player with its own control switches. The same space may include cable-enabled devices such as set top boxes providing television signals and the like. While each audio/video device is doing precisely what it was designed to do, each operates completely independent from the others with the possible exception of the portable MP3 player that may be connected to a PC for synchronization. As a result, a user ends up going from one keypad to another or juggling a series of remote controls in order to control the devices.

Since these audio/video and similar devices are not designed to communicate with each other or their communication is very limited, access to these audio/video devices is limited by their physical locations. For example, it is difficult to play a digital audio files (such as MP3, WMA, etc.) saved in a PC hard disk drive in one room or area (a child's bedroom) on speakers located in another room or area (an entertainment room). Thus, in order for a user to enjoy music of his or her choice whenever and wherever he or she wants, each room needs to be equipped with all the necessary audio/video equipment and digital audio/video content.

Also, the audio/video devices are not designed to communicate with other devices (e.g., TV, lighting, security system, etc.). Thus, it is difficult, if not impossible, to converge the devices for common control for certain occasions. For example, in order to watch a movie, the user must turn on a TV, a DVD player and an audio amplifier by using three different remote controls. Then the user must set the TV to receive a video signal from the DVD player, set the audio amplifier to receive an audio signal from the DVD player and use another control unit to adjust the lighting of the room. Even when a user utilizes a universal remote, as is known in the art, the result is a plurality of devices that are separately operated and are operated separately from a single universal remote. These devices do not converge as described above because the devices lack any ability to easily connect and effectively communicate with each other, and be controlled by a single input device.

Accordingly, there is a need for a solution for the aforementioned accessibility, connectability and convergence issues to allow devices to connect, communicate and be controlled.

SUMMARY OF THE INVENTION

The invention meets the foregoing needs using an automation specific IP based automation protocol, which results in a significant increase in discovery and communications between devices along with an IP based input device and other advantages apparent from the discussion herein.

Accordingly, in one aspect of the invention, a process of operating an automation system in a Web Service environment includes providing at least one client and at least one device, the at least one client and the at least one device configured with a web services for devices stack protocol, connecting a network comprising at least one server with the web services for devices to the at least one client and the at least one device, connecting a touch screen device as another at least one client to the network, the touch screen device implemented with a user interface for controlling the at least one device, and transmitting automation-based control and communication between the at least one client and at least one device, wherein the at least one device comprises one of an audio system, a video system, an intercom system, a lighting system, a security system, a link, and a HVAC system.

The at least one client may include one of a TV, a personal computer, a personal digital assistant, and a game controller.

The process may further include receiving a user input to the touch screen device through at least one of hotspot arranged on a front surface of a touch screen housing configured to activate a predetermined function upon being touched and at least one slider area arranged on an edge portion of the housing configured to provide increasing or decreasing activation of a predetermined function responsive to a sliding touch. The process may further include generating audio from the touch screen device with at least one speaker. The process may further include at least one of receiving IR input to the touch screen device through an IR receiver and sensing light in the touch screen device with a photocell sensor. The web services for devices stack may include a services tier that provides communication via at least one of HTTP and UDP wherein the communication via HTTP and UDP comprises information contained in SOAP packets, and a logical interface with the at least one client, and the web services for devices stack protocol comprises a web service for each at least one device, wherein the web services for devices stack protocol may include a service provider configured as a generic host for web services. The web services for devices stack protocol may further include one of a component configured to host multiple services, and a controller configured to communicate with the at least one device and wherein the web services for devices stack protocol further comprises a device bridge configured to translate commands for the devices.

Accordingly, in another aspect of the invention, a machine-readable medium includes instructions stored therewith, which, when executed by a processor cause the processor to establish an automation system in a Web Service environment. The machine-reachable medium includes instructions for providing automation-based control and communication between at least one client and at least one device, the at least one client and the at least one device configured with a web services for devices stack protocol configured to the at least one client and at least one device, instructions for configuring a network comprising at least one server to be connected to the at least one client and the at least one device with the web services for devices, and instructions for coupling a touch screen device as another at least one client to the network and configured to provide the touch screen device coupled thereto with a user interface for controlling the devices, wherein the at least one device may include an audio system, a video system, an intercom system, a lighting system, a security system, a link, and a HVAC system.

The at least one client may include one of a TV, a personal computer, a personal digital assistant, and a game controller. The machine-readable medium may further include instructions for generating audio from the touch screen device with at least one speaker. The machine-readable medium may further include instructions for receiving IR input to the touch screen device through an IR receiver. The machine-readable medium may further include instructions for sensing light in the touch screen device with a photocell sensor. The web services for devices stack protocol may include a services tier that provides communication via at least one of HTTP and UDP wherein the communication via HTTP and UDP comprises information contained in SOAP packets, and a logical interface with the at least one client, and the web services for devices stack protocol comprises a web service for each at least one device. The controller may be configured to send feedback from the at least one device to the at least one client.

Accordingly, in another aspect of the invention, an automation system operating in a Web Service for Devices environment includes at least one client and at least one device, the at least one client and the at least one device configured with a web services for devices stack protocol configured to provide automation-based control and communication between the at least one client and at least one device, a network comprising at least one server configured to be connected to the at least one client and the at least one device with the web services for devices, and a touch screen device coupled to the network as another at least one client to provide a user interface to control the at least one device, wherein the at least one client further comprises one of a TV, a personal computer, a personal digital assistant, and a game controller and the at least one device comprises an audio system, a video system, an intercom system, a lighting system, a security system, a link, and a HVAC system.

The touch screen device may include a display panel, a housing holding the display panel and a rear compartment arranged on a rear surface of the display panel and containing components for driving the display panel. The housing may include at least one hotspot arranged on a front surface of the housing configured to activate a predetermined function upon being pushed, and at least one slider area arranged on an edge portion of the housing configured to provide increasing or decreasing activation of a predetermined function. The touch screen device may further include at least one speaker. The touch screen device further may further include an IR receiver. The touch screen device may further include a photocell sensor.

Additional features of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced. In the drawings.

DETAILED DESCRIPTION OF THE INVENTION

Figure 1:
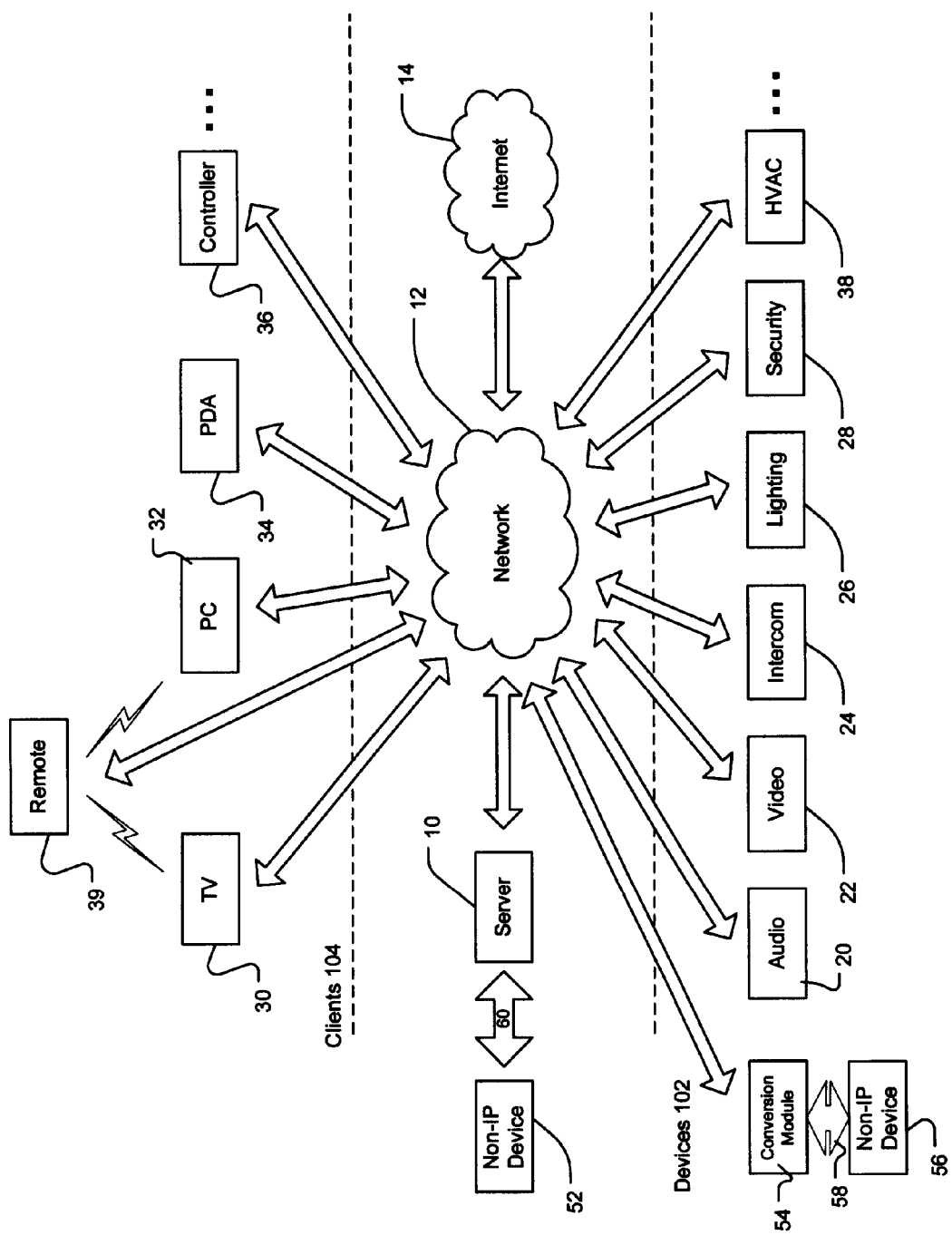
FIG. 1 shows an schematic overview of a convergence and automation solution constructed according to the principles of the invention.

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings.

FIG. 1 schematically shows an overview of a convergence solution according to an embodiment of the invention. The convergence solution may be a combination of hardware and software. The hardware may include a server 10 connected to a network 12 (e.g. IP based wired or wireless network such as an Ethernet network) and may possibly be connected to the internet 14, devices 102 (e.g. audio 20, video 22 (e.g., STB), intercom 24, lighting 26, security system 28, HVAC 38, and the like) and clients 104 (e.g. TV 30, personal computer (PC) 32, personal digital assistance (PDA) 34, controller 36 such as a control panel, game controller (i.e. X-Box™, not shown) and the like). Moreover, the clients 104 may include a remote control 39 or a remote control may be configured to be a client 104. The server 10 may be any type of computer, such as a PC connected to the network 12. The clients 104 such as clients 30, 32, 34, 36 may provide a user with control over the devices 102 such as devices 20, 22, 24, 26, 28, 38.

FIG. 1 further schematically shows interaction of the convergence a solution interacting with non-internet protocol devices such as non-internet protocol devices 52, 56. Non-internet protocol device 52 (non-IP) device is considered non-internet protocol in that it does not include a communications interface that is IP based. The non-IP device 52 may include other types of (serial, COM port, and the like) communication protocols. Accordingly, the server 10 may be configured to include various inputs and outputs to provide communication and control to various devices such as non-IP device 52. Non-IP device 52 may be implemented as any number of different devices including, for example only, window shade automation devices, audio devices, video devices and so on.

FIG. 1 further shows implementation of the convergence solution that may communicate with a non-IP device such as the non-IP device 56 that not arranged proximate to server 10. In order to accomplish communication between the non-IP device 56 and the network 12, a link or conversion module 54 may be arranged in communication with the network 12. The conversion module 54 connects to the network with an Ethernet type connection that provides internet protocol communications with the network 12. The conversion module 54 further provides a second type of communication connection as shown by 58 that may be any type of communication protocol as noted above with respect to communication protocol 60. Accordingly the non-IP device 56 may then communicate via network 12 and operate as a web service device accordingly.

The software (i.e., application) enables the hardware such as the server 10, devices 102, and clients 104 to communicate with each other despite their different proprietary languages and communication protocols, and may provide the user with control over most or all the hardware from a single client. The application may utilize at least one portion of the hardware to send commands to the devices 102 and receive feedback from them. The application may integrate centralized device control into a PC based media environment (e.g., Microsoft Media Center™ environment) that may store, organize and play digital media content. The user may use the same remote control 39 to listen to music, watch and record television, enjoy family photographs and home movies, as well as adjust the lighting, secure the home, adjust the temperature, distribute music throughout the house, check surveillance cameras and the like.

The application may be implemented with Web Services. The Web Services use standard Internet protocol (IP) and are based on standard XML-related technologies such as SOAP (Simple Object Access Protocol) for communications and WSDL (Web Services Device Language) to describe interfaces. The devices implemented with Web Service for Device (WSD) become black boxes on the network, providing services to any application, on any platform, written in any language.

Alternatively or additionally, if the server 10 or the PC 32 is running a SideShow™ enabled operating system such as Microsoft Windows Vista™, the devices may be configured as a SideShow™ device or "gadget." A SideShow™ device or gadget may communicate with any client or device implemented with WSD in the network via protocols according to SideShow™ XML communication specifications. Moreover, the server 10 or the PC 32 using Microsoft Windows Vista™ may be running a SideShow™ gadget application running on the Microsoft Windows Vista™ computer providing a user interface rendering for the device that communicates with automation control devices via WSD technology.

Alternatively or additionally, the WSD technology may be implemented using Device Profile for Web Services (DPWS). The DPWS may be used to define how various devices may be able to use Web Services in conjunction with the convergence solution noted above. The DPWS further may allow and/or ensure interoperability between the various devices 102 and the clients 104 and the like. Moreover, the DPWS may allow for support of resource constrained devices within the convergence solution shown in FIG. 1. One benefit of DPWS is its ability to enable device and service discovery within the convergence solution of FIG. 1. The DPWS may allow for and support rich eventing, an end point, and may be built on standards and WS specifications. More specifically, the end point may provide device/host metadata. Additionally, the DPWS specifications may include HTTP, WSDL, SOAP, WS-Discovery, WS-Addressing, WS-Eventing, WS-metadata, transfer, and the like.

Figure 2:
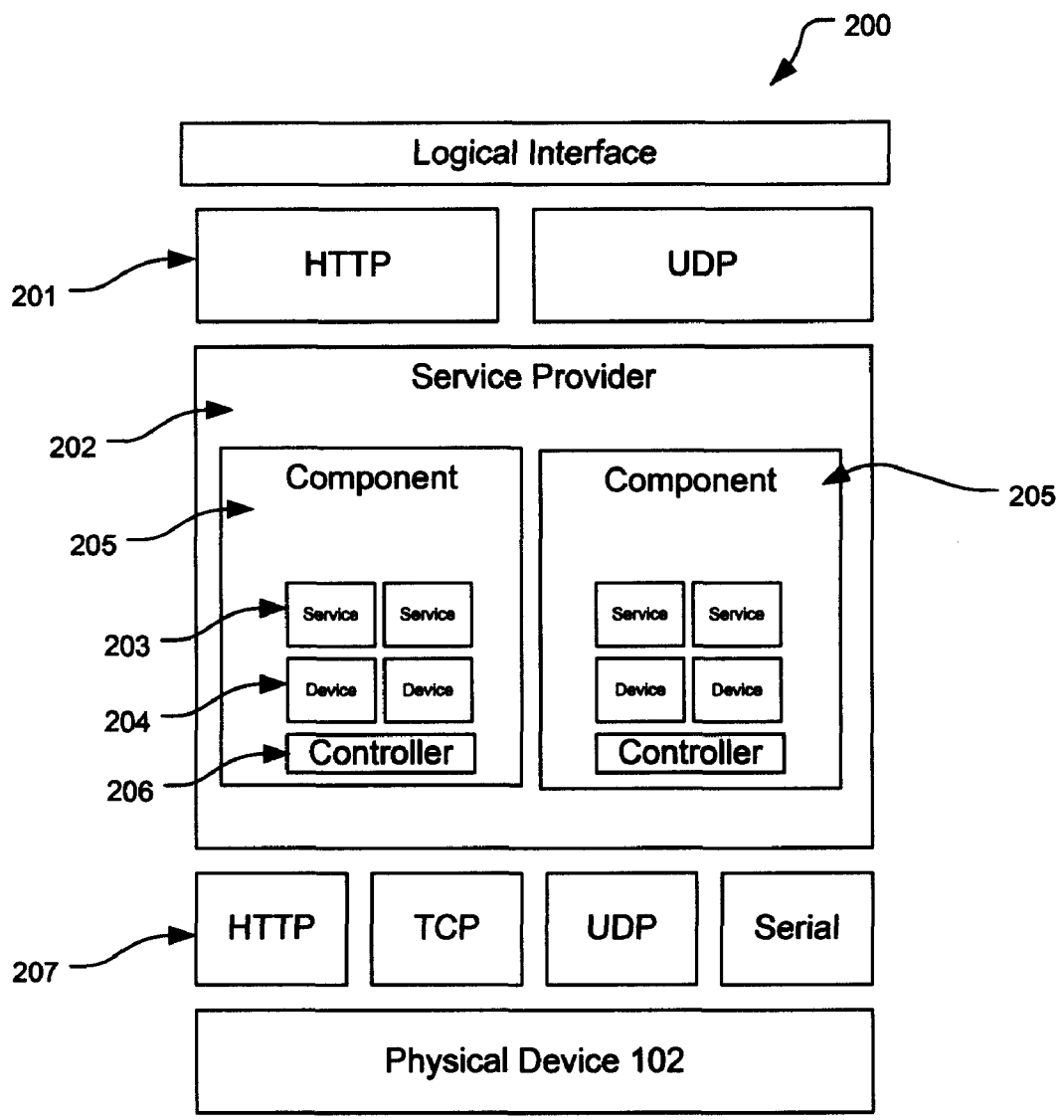
FIG. 2 schematically shows the web services for devices stack for use in the convergence and automation solution of FIG. 1, constructed according to principles of the invention.

FIG. 2 schematically shows the Web Services for Devices (WSD) Stack for use in the convergence solution of FIG. 1, constructed according to the principles in the invention. The WSD stack as referenced herein refers to the protocol architecture. In particular, FIG. 2 shows the WSD Stack 200. The WSD stack 200 of the invention is a particular automation software implementation of a Web Services computer networking protocol suite. The individual protocols are designed with a single purpose in mind. Because each protocol module may only communicate with two others, the modules are commonly imagined as layers in a stack of protocols. The lowest protocol always deals with "low-level," physical interaction of the hardware. Every higher layer adds more features. As described in greater detail below, the WSD Stack 200 allows and enables the discovery of devices in a network, such as the convergence solution of FIG. 1 and the devices on the network in a light weight, simple fashion. Using the WSD Stack 200, a device 102 in the network is able to send a message to determine what services are available enabling discovery of the device 102.

The WSD Stack 200 is the software that may be used to process protocols. The WSD Stack 200 is required to use a specific set of protocols. In particular, the WSD Stack 200 leverages Web Services for Devices to create a powerful, extensible system that may communicate with a wide variety of devices 102 described in greater detail above. As shown in FIG. 2, the WSD Stack is shown schematically at a high level. The WSD Stack 200 in FIG. 2 shows the communication to and from clients 104 at the top of the diagram via a logical interface and the various hardware devices 102 arranged at the very bottom of FIG. 2.

The logical interface initially communicates with and through the WSD Stack 200 via a Hyper Text Transfer Protocol (HTTP) or a User Datagram Protocol (UDP) as indicated by reference numeral 201. The HTTP enables data transfer and display of web pages and the like as is well known in the art. The UDP enables a direct way to send and receive datagrams on an IP network as is well known in the art. Accordingly, the clients 104 interface via the logical interface through one or both of the HTTP and UDP layers 201 to a service provider 202. For example, communication from the client 104 to the service provider 202 may be via the HTTP or UDP information and the communication may be contained in SOAP packets.

The service provider 202 may be configured as a large, generic host for web services. The service provider 202 may host one or more components 205 therein. A component 205 may have the ability to host multiple services. However, the component 205 may limit the relationship between a service and a device to a one-to-one relationship.

A further part of the component 205 is the web service 203. The web service 203 exists for each device 204. The web service 203 may be configured as a generic web service based on the device category. For example, a thermostat has a corresponding web service based on the HVAC category for example only.

Each web service 203 may be configured with a device bridge 204. The device bridge 204 may be configured to essentially translate commands by the physical devices 102. Accordingly, each device bridge 204 may be specific to the specific make of the physical device 102.

The service provider 203 may further include a controller 206. The controller 206 may be arranged to communicate with the devices 102. The controller 206 may be configured to have a ratio of one controller per component 205. The controller 206 may include the ability to send feedback from the devices 102 to the component 204. The component 204 may then route the feedback to the appropriate web service 203. Accordingly, this arrangement provides the ability for feedback from the devices 102 to various clients 104.

The service provider 202 next may communicate to the various physical devices 102 via one or more of a plurality of different communications protocol 207. In particular, the communications protocol with the devices 102 may include any type of native or proprietary format. Such native or proprietary formats may be sent via Hyper Text Transfer Protocol (HTTP), transmission control protocol (TCP), user datagram protocol (UDP), or serial protocols. The TCP enables two hosts to connect. The serial protocol provides one or two way serial communication as is well known in the art.

Accordingly, the WSD Stack 200 creates a powerful and extensible system based on web services for devices. Moreover, the WSD Stack 200 may communicate with a wide variety of devices 102 as discussed in detail with respect to FIG. 1 above. Using the WSD Stack 200 allows network components to become "black box" components. This allows the various clients 104 and devices 102 to communicate in a clearly defined way without needing to know how they are accomplishing their various tasks. Using the WSD Stack 200 allows components to be implemented on any application running on any platform and written in any language. In essence, when the WSD Stack 200 is implemented, the network location and communications are handled by the platform, allowing application developers to focus solely on application problems. It should be noted that various modifications to the WSD Stack 200 are contemplated by the invention.

Figure 3:
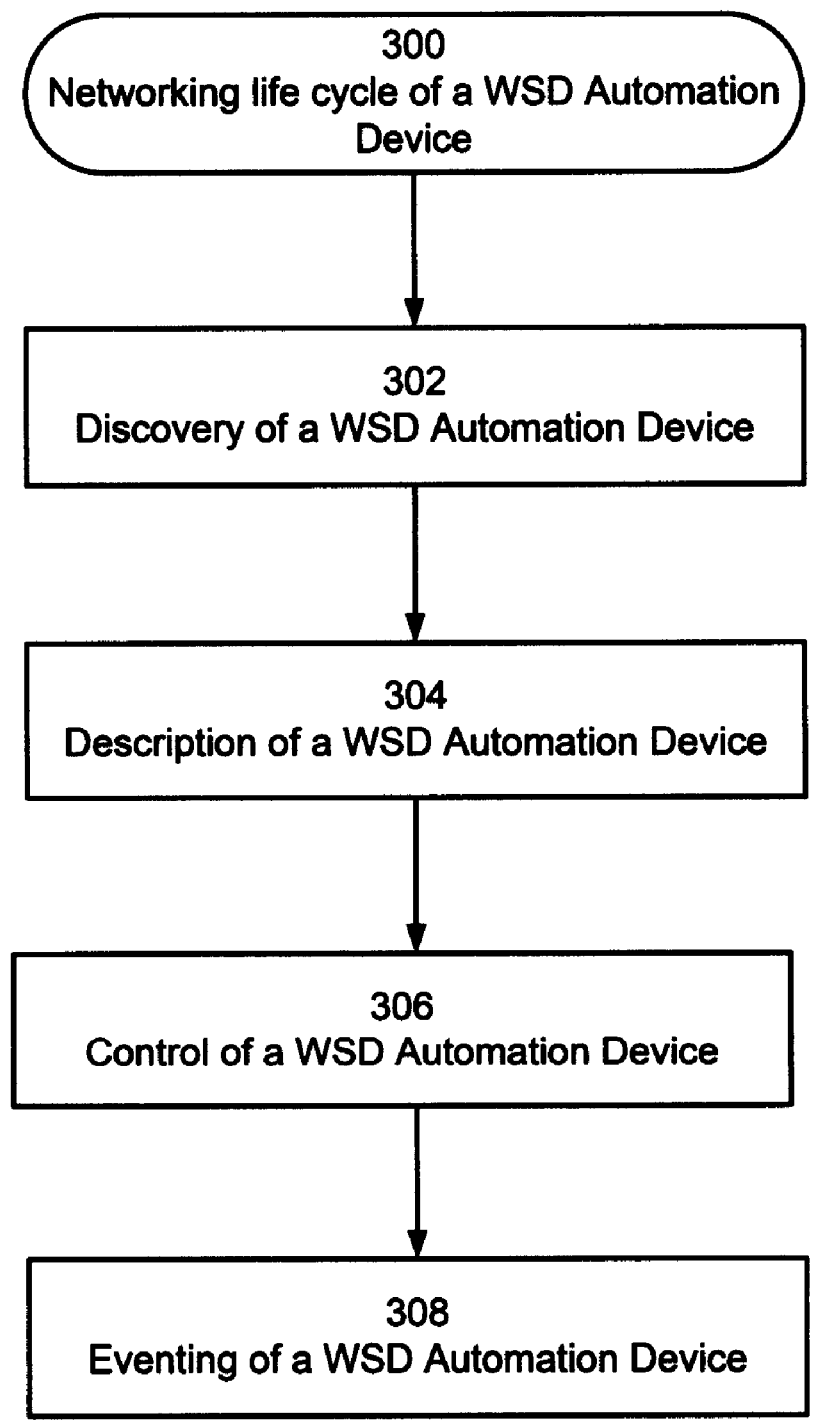
FIG. 3 shows a device life cycle operating according to the principles of the invention.

FIG. 3 shows a device life cycle operating according to the principles of the invention. In particular, FIG. 3 shows the various portions of the life cycle of a device networking using the WSD Stack 200 described above and shown in FIG. 2 in a device 102 as shown in FIG. 1 above. Initially, as shown in FIG. 3, the first step in a device 102 in its life cycle on the network is discovery 302. Discovery 302 as used in conjunction with the WSD Stack 200 may use the WS-Discovery specification. The WS-Discovery specification may include multicast announcements, multicast query requests such as probe and probe match, and unicast responses. In this regard, a device 102 may probe a client 104 using the discovery networking life cycle 302 to receive a probe match from the client 104. In this regard, discovery of the device 102 by one or more clients 104 is straight forward and essentially automatic. More specifically, a device 102 may announce its presence as it is connected to the network 12. This announcement may be through a sending out of a hello or bye message by device 102 on to the network 12. Additionally, the device 102 may respond to a client 104 request including various probe and resolve type requests. A probe request may include the ability to identify a device or service within the client 104 or device 102. The resolve request may include the ability to locate a device 102 or service end point. The result is the ability to get or obtain information via metadata exchange during the discovery 302 process.

The next step in the networking life cycle of the WSD Stack 200 process includes the step of description 304. The step of description 304 may include a metadata exchange. This metadata exchange may be a response to a "get request." The description step 304 may thus include the WS-Metadata exchange protocol and may moreover include the WSDL or SOAP/XML information exchange. The WSDL (Web Services Description Language) may be used in combination with the SOAP and XML schema to provide web services. A device connecting to the network 12 may read the WSDL to determine what functions are available on the network 12, clients 104 and the like. The SOAP (Simple Object Access Protocol) is a protocol that may be used for exchanging XML based messages over the network 12.

The next step in the networking life cycle shown in FIG. 3 is the step of control 306. In the step of control 306, control over a device 102 may be exercised by sending messages to the device 102 and/or services hosted by the device 102. The control 306 may be defined by the WSDL and XML schema. This definition of control 306 may ensure a common base line for interoperability.

Finally, the last step in the networking life cycle shown in FIG. 3 is the step of eventing 308. The eventing step 308 may include the WSD Stack 200 web service-eventing and may again use the SOAP/XML schema. In particular, the eventing 308 may allow for a rich eventing model. This model may allow for detailed events through WSDL. The eventing 308 may allow a client to subscribe to various events. Moreover, the eventing 308 may allow for the device 102 to push events to the clients 104.

Figure 4:
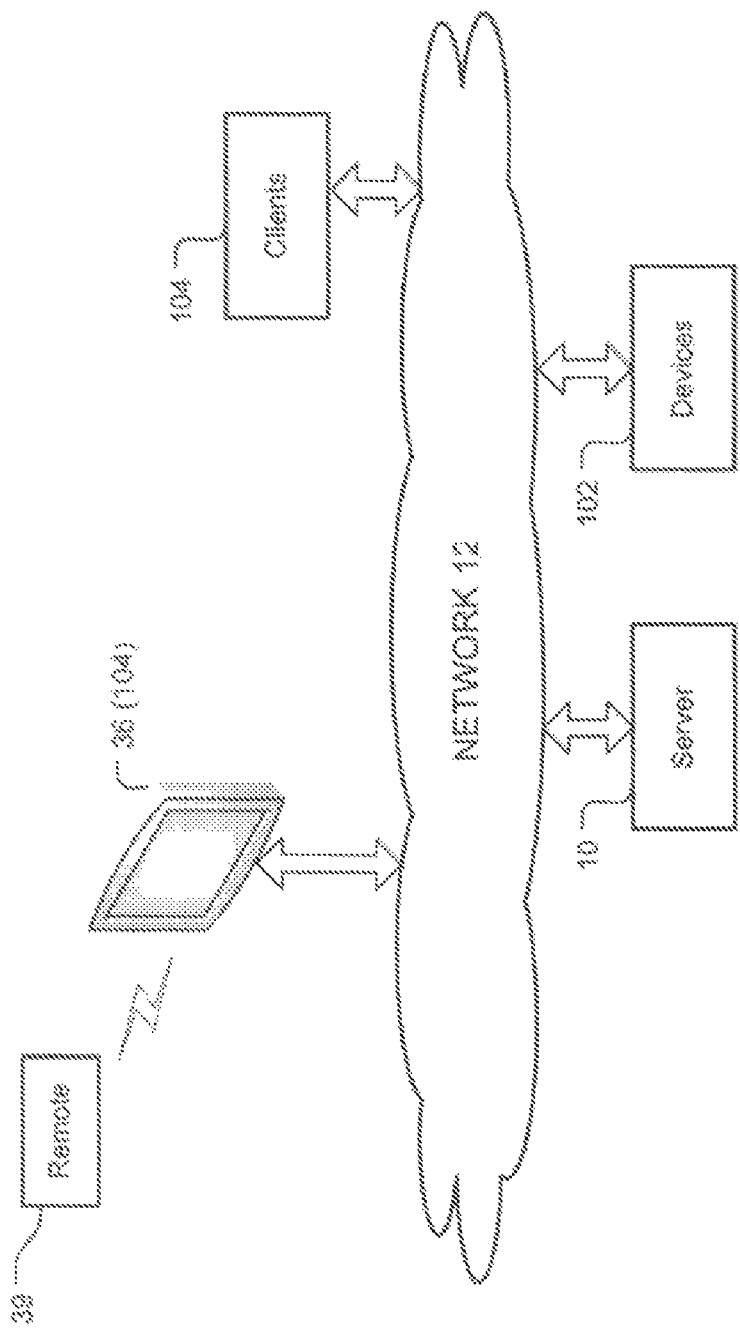
FIG. 4 shows a schematic overview of the convergence and automation solution of FIG. 1 implemented with a touch screen.

Shown in FIG. 4, the convergence solution may further include a control panel 36 configured to interact with the network 12 in order to provide the clients 104 (e.g., TV 30, PC 32, control panel 36 and the like) connected thereto with the capability to control the convergence solution. For example, the control panel 36 may provide a graphical user interface (GUI) to the clients 104 connected thereto (e.g., television 30, PC 32, PDA 34 or remote control device 39).

In an exemplary embodiment, the network 12 may communicate via Internet Protocol via a wired and/or wireless Ethernet network. The devices 102 and clients 104 may communicate via a variety of native protocols such as RS-232, RS-485, USB, WSD, wireless mesh network (e.g. Z-Wave, ZigBee), IP, or UPnP, but not necessarily limited to those protocols. Exemplary control devices which may be implemented to monitor and/or control the automation devices/functions may include a TV GUI, infrared or radio frequency remote control, personal computer (PC), web-enabled tablet, PDA, mobile phone or other device, to name only a few examples.

Figure 5A:
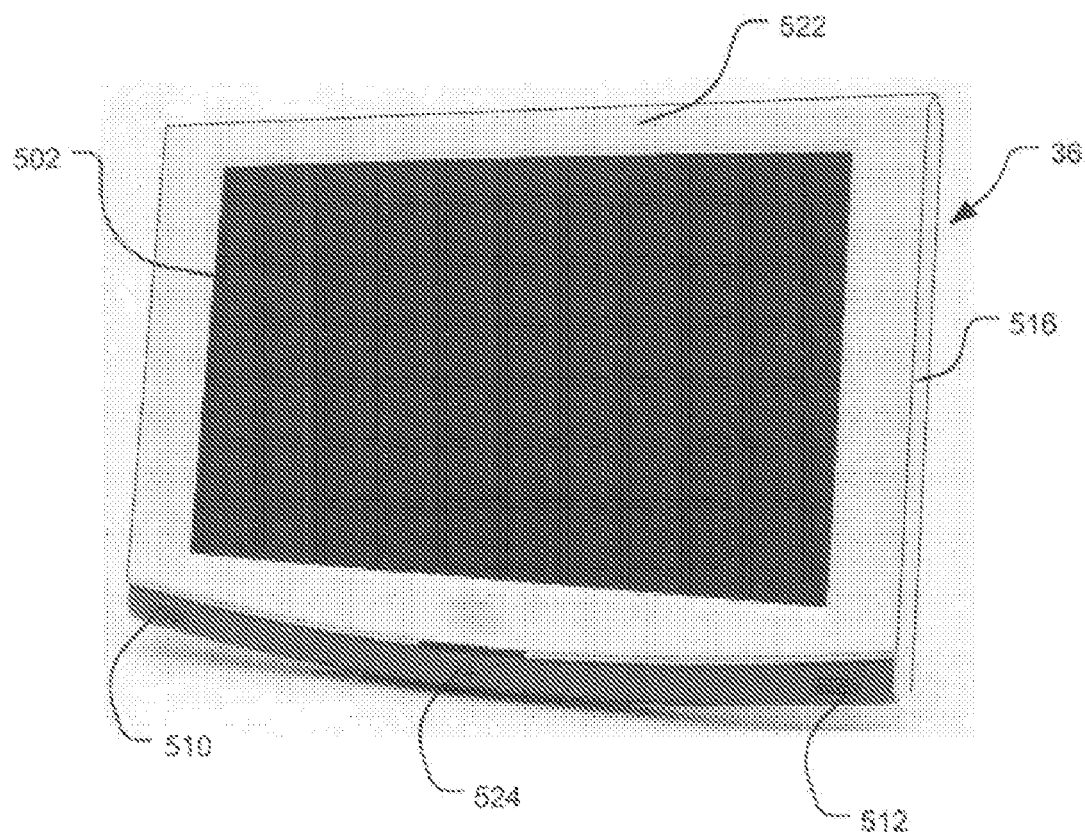
FIGS. 5A and 5B show front and side perspective views of the touch screen of FIG. 4, constructed according to principles of the invention.
Figure 5B:
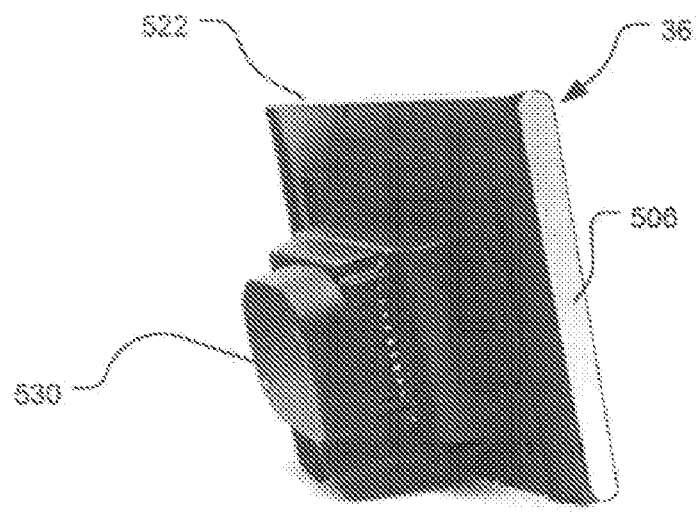

In an embodiment, the control panel 36 may be a touch screen device as shown in FIGS. 5A and 5B. The touch screen device 36 may include a display panel 502. The display panel 502 may be an LCD type display. However, any other type of display technology is contemplated for use as the display 502. Also, the touch screen device 36 may include a housing 522 that may include key holes and keys to interact with each other and to hold the touch screen device 36 in place without any other mechanical fasteners (not shown). Additionally, the touch screen device 36 may include an audio line out type of arrangement including speakers 510, 512 to provide audio output for the touch screen device 36. Moreover, the touch screen device 36 may include a microphone 524 for receiving audio input for intercom functions and the like. It is contemplated that the touch screen device 36 may be voice activated to receive voice commands/inputs and be able to operate in response thereto.

The touch screen device 36, because it is web based, may require only an wired or wireless Ethernet connection as shown in FIG. 4 and a power connection. For example, the Ethernet connection may be a typical RJ45-type connection, and the power connection may be a 14-16 gauge-type wire pair connecting to a DC power source 12 volts, and the like. The touch screen device 36 may be based on a notebook processor, for example, an Intel™ Pentium M-type processor or Core™ Duo Processor. The touch screen device 36 may include a touch sensor arrangement overlaid on the display panel 502. Moreover, the touch screen device 502 may be arranged with a plurality of USB type connections or the like. The touch screen device 36 may also be configured to have a virtual QWERTY type keyboard that may be virtually arranged on the display panel 502 for entry of alpha-numeric characters by touching areas of the display 502.

The touch screen device 36 may further be provided with an IR (infrared) receiver for receiving an IR signal from a remote control device, for example, the remote 39 in FIG. 4, to control the touch screen device 36. The IR receiver may be used for other functions as well. Also, the touch screen device 36 may include a photocell sensor, which may be used to sense ambient light to control the display brightness of the display panel 502 and/or automatically adjust the ambient light level in a room. The photocell may also be used for other functions as well.

In FIG. 5B, the touch screen device 36 may have a rear compartment 530 to house components including a CPU board, base board and hard drive. Additional components may be also contained in the rear compartment 530 such as a blower fan, heat-sink, fan power jack and fan power cable. The blower fan may be implemented as to be dynamically controlled based on internal temperature. The rear compartment 530 may have exhaust opening for directing the exhaust air from the squirrel cage blower fan.

Figure 6:
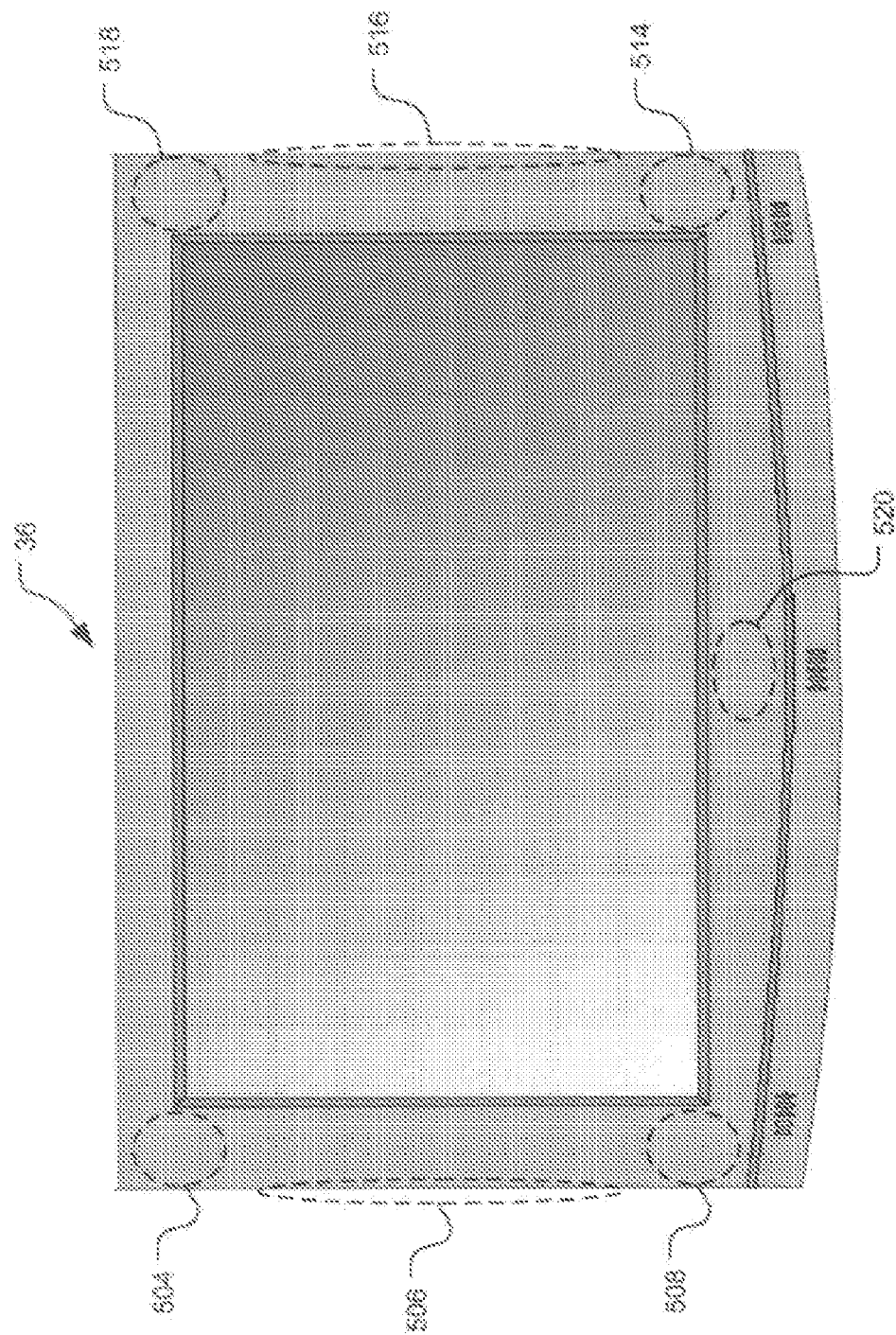
FIG. 6 shows hot spots and slide areas implemented in the touch screen of FIGS. 5A and 5B.

In FIG. 6, the touch screen device 36 may include a plurality of hot spots 504, 508, 518, 514, and 520, which may be used for command or input from a user by touching that part of the housing 522. The hotspots 504, 508, 518, 514, and 520 may be capacitive sensing. However, any type of touch sensitive technology is contemplated for use with the invention. Each of these hotspots 504, 508, 518, 514, and 520 may be assigned with a particular feature, for example, turning on the lights, turning on a stereo, turning on the television and the like. Additionally, the touch screen device 36 may include slider areas 506, 516 along the sides thereof. Again, these slider areas 506, 516 may use a capacitive type sensing mechanism to sense a sliding user input. Sliding a finger, for example, up or down the areas 506, 516 may provide an increasing or decreasing actuation of a particular home automation component such as lights or audio volume. Furthermore, the display panel 502 may include a touch sensitive capacitive overlay which allows a user to touch various virtual buttons that are formed on the surface of the display panel 502.

Figure 7A:
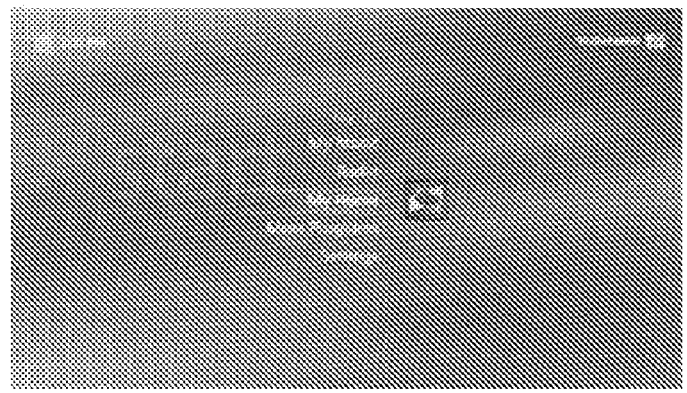
FIGS. 7A, 7B and 7C show screen capture images of the touch screen of FIG. 6 displaying weather-related information.
Figure 7B:
Figure 7C:
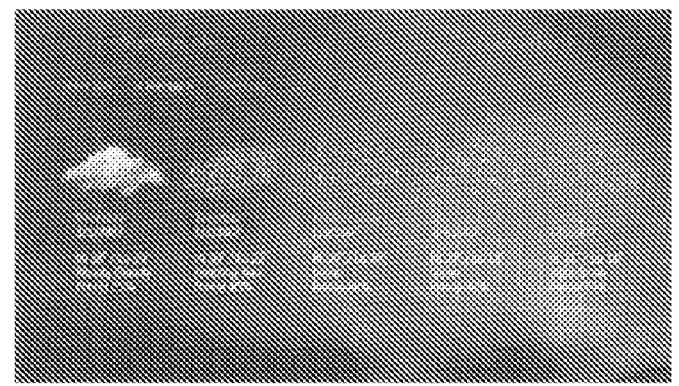

As mentioned above, once the touch screen device 36 is connected to the network 12, the touch screen device 36 may be used to control the devices 102 of the convergence and automation system. For example, the touch screen device 36 that runs on the PC based media environment (e.g., Microsoft Media Center™ environment), the user may use the touch screen device 36 to listen to music, watch and record television, enjoy family photographs and home movies, as well as adjust the lighting, secure the home, adjust the temperature, distribute music throughout the house, check surveillance cameras and the like. For example, FIGS. 7A, 7B and 7C show screen capture images of the weather-related contents displayed on the touch screen device 36. In case the user wants to know the current temperature, he or she may simply navigate the menu displayed on the screen of the touch screen device 36. Particularly, FIG. 7A shows a start menu where the user can select one of the categories such as "My TV," "MY Music," "Radio," "My Home," "More Programming," "Settings," and the like. To access the information related to weather, the user may select "My Home" by either touching the portion of the touch sensor arrangement overlaid on the "My Home" text or activating the hotspots 504, 508, 518, 514, and 520 and/or slider areas 506, 516, programmed for such as mentioned above. Depending on the user's navigation, the touch screen device 36 may display the current temperature of the house as shown in FIG. 7B or the weather forecast as shown in FIG. 7C which may be obtained from the internet 14.

Figure 8A:
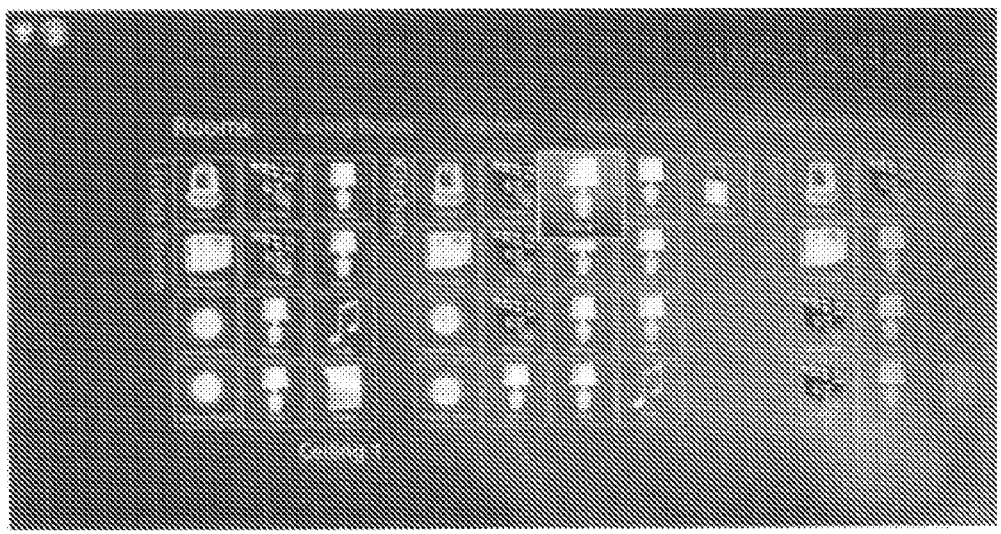
FIGS. 8A and 8B show screen capture images of the touch screen of FIG. 6 displaying lighting-related information.
Figure 8B:
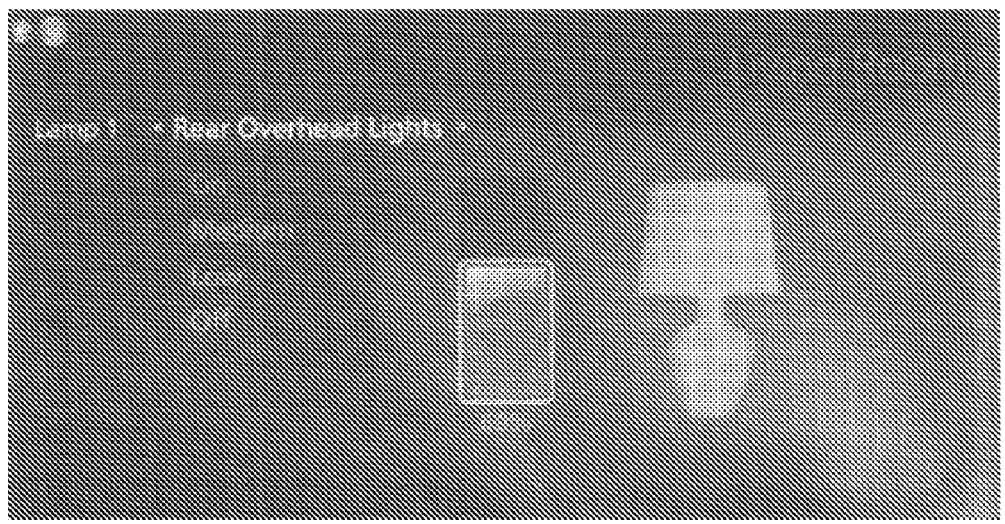

As mentioned above, the touch screen device 36 allows the user to control the devices 102. For example, FIGS. 8A and 8B show screen capture images of the lighting control-related contents displayed on the touch screen device 36. Particularly, FIG. 8A shows a lighting menu where the user can select any lighting device in the house for activation or adjustment. FIG. 8B shows that the rear overhead lights in the living room have been selected and the user may select the light level of the selected lighting device using the touch sensor arrangement or activating the hotspots 504, 508, 518, 514, and 520 and/or slider areas 506, 516.

Figure 9A:
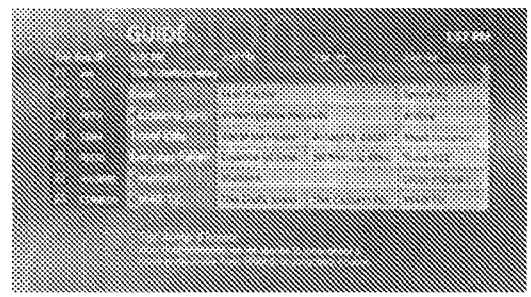
FIGS. 9A, 9B and 9C show screen capture image of the touch screen of FIG. 6 displaying media-related information.
Figure 9B:
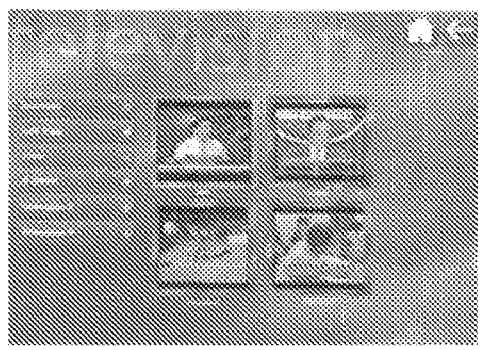
Figure 9B:
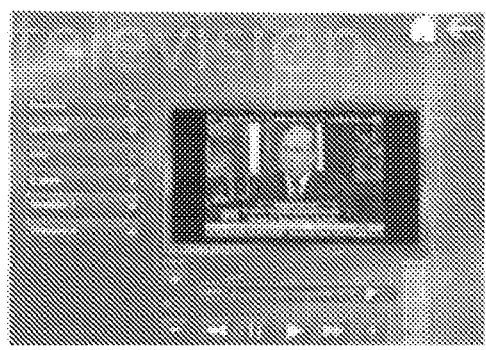
Figure 9C:
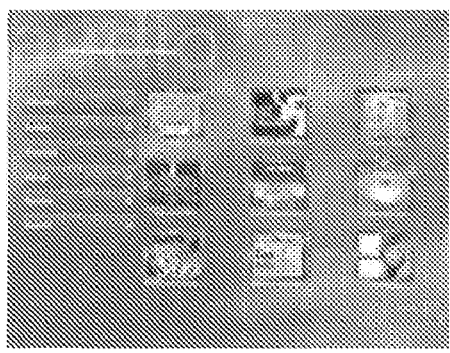
Figure 9C:
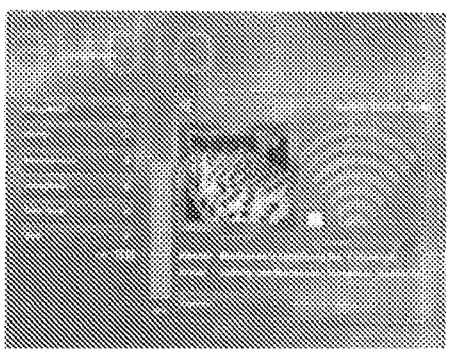
Figure 10A:
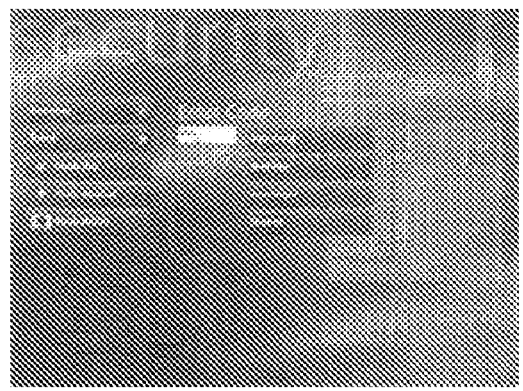
FIGS. 10A, 10B and 10C show screen capture image of the touch screen of FIG. 6 displaying security, camera and shade related information.
Figure 10B:
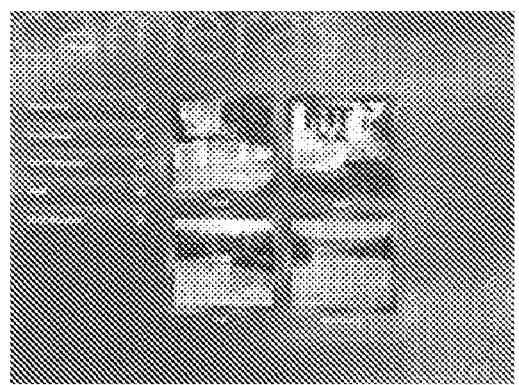
Figure 10C:
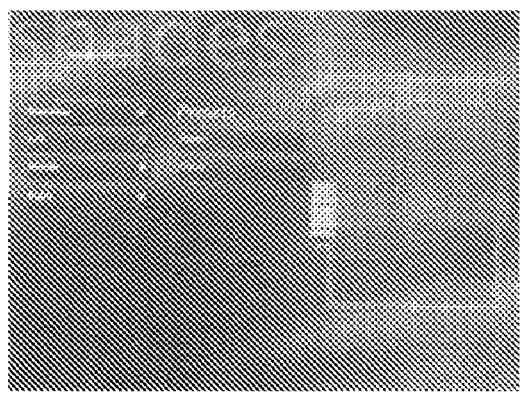

The touch screen device 36 may also be used to control media devices. For example, FIG. 9A shows a TV programming guide displayed on the touch screen device 36, which allows the user to select a TV program to watch or record. As shown in FIG. 9B, the touch screen device 36 may be configured to show multiple channels of the same categories such as news, sports, movies and the like, and play previously recorded programs at any location where the touch screen device 36 is installed. Similarly, the touch screen device 36 may be used to search and play music files and adjust the volume and/or change speaker and/or equalizer setups, as shown in FIG. 9C. Additionally, the touch screen device 36 may be used to set, change, unlock the security system 28 as shown in FIG. 10A, watch feed from multiple surveillance cameras as shown in FIG. 10B, and open or close the shades in the house as shown in FIG. 10C.

In accordance with various embodiments of the invention, the methods described herein are intended for operation with dedicated hardware implementations including, but not limited to, semiconductors, application specific integrated circuits, programmable logic arrays, and other hardware devices constructed to implement the methods and modules described herein. Moreover, various embodiments of the invention described herein are intended for operation with as software programs running on a computer processor. Furthermore, alternative software implementations including, but not limited to, distributed processing or component/object distributed processing, parallel processing, virtual machine processing, any future enhancements, or any future protocol can also be used to implement the methods described herein.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention.

What is claimed is:

1. An automation system operating in a Web Service for Devices (WSD) environment, comprising:
   a server, at least one client and a plurality of devices implemented with a WSD stack interface, each client configured to control the at least one of the plurality of devices, the plurality of devices grouped into one or more device categories based on functions thereof;
   an Internet Protocol (IP) based network among the server, the at least one client and the plurality of devices,
   wherein the WSD stack interface is configured to establish communication among the server, the at least one client and the plurality of devices regardless of a difference thereamong in at least one of a proprietary language and communication protocol via the IP based network according to a WSD protocol architecture, the WSD protocol architecture comprising:
      a first communication layer configured to logically interface the at least one client;
      a second communication layer configured to physically interface the plurality of devices; and
      a service provider layer stacked between the first and second communication layers and hosting one or more components, each component provided for a particular device category in a one-to-one relationship and hosting one or more Web Services, one or more device bridges and a controller,
   wherein each Web Service is provided for a particular device of the device category corresponding to the component in a one-to-one relationship and configured to function as a Web Service host for the particular device,
   wherein each device bridge is provided for a particular Web Service in a one-to-one relationship and configured to translate communication between the particular Web Service and the particular device corresponding thereto, each device bridge being specific to a specific make of the particular device, and
   wherein the controller is provided for the component in a one-to-one relationship and configured to communicate with the one or more devices of the same device category corresponding to the component and receive feedback from the one or more devices of the corresponding device category to the component.

2. The automation system of claim 1, wherein the at least one client comprises a touch screen device implemented with a user interface for controlling at least one of the plurality of devices.

3. The automation system of claim 2, wherein the touch screen device comprises:
   a display panel;
   a housing holding the display panel; and
   a rear compartment arranged on a rear surface of the display panel and containing components for driving the display panel.

4. The automation system of claim 3, wherein the housing comprising:
   at least one hotspot arranged on a front surface of the housing configured to activate a predetermined function upon being pushed; and
   at least one slider area arranged on an edge portion of the housing configured to provide increasing or decreasing activation of a predetermined function.

5. The automation system of claim 3, wherein the touch screen device further comprises at least one speaker.

6. The automation system of claim 3, wherein the touch screen device further comprises an IR receiver.

7. The automation system of claim 3, wherein the touch screen device further comprises a photocell sensor.

8. A non-transitory machine-readable storage medium comprising instructions stored therewith, which, when executed by a computer cause the computer to establish an automation system in a Web Service environment, the machine-readable storage medium comprising:
  instructions for implementing a server, at least one client and a plurality of devices with a Web Services for Devices (WSD) interface, each client configured to control the at least one of the plurality of devices, the plurality of devices grouped into one or more device categories based on functions thereof;
  instructions for establishing an Internet Protocol (IP) based network among the server, the at least one client and the plurality of devices; and
  instructions for enabling communication among the server, the plurality of devices and the at least one client via the IP based network using the WSD interface,
  wherein the WSD interface is configured to establish communication among the server, the at least one client and the plurality of devices regardless of a difference thereamong in at least one of a proprietary language and communication protocol via the IP based network according to a WSD protocol architecture, the WSD protocol architecture comprising:
    a first communication layer configured to logically interface the at least one client;
    a second communication layer configured to physically interface the plurality of devices; and
    a service provider layer stacked between the first and second communication layers and hosting one or more components, each component provided for a particular device category in a one-to-one relationship and hosting one or more Web Services, one or more device bridges and a controller,
    wherein each Web Service is provided for a particular device of the device category corresponding to the component in a one-to-one relationship and configured to function as a Web Service host for the particular device,
    wherein each device bridge is provided for a particular Web Service in a one-to-one relationship and configured to translate communication between the particular Web Service and the particular device corresponding thereto, each device bridge being specific to a specific make of the particular device, and
    wherein the controller is provided for the component in a one-to-one relationship and configured to communicate with the one or more devices of the same device category corresponding to the component and receive feedback from the one or more devices of the corresponding device category to the component.

9. The non-transitory machine-readable storage medium of claim 8, wherein the at least one client comprises a touch screen device implemented with a user interface for controlling at least one of the plurality of devices.

10. The non-transitory machine-readable storage medium according to claim 9, further comprising instructions for generating audio from the touch screen device with at least one speaker.

11. The non-transitory machine-readable storage medium according to claim 10, further comprising instructions for receiving IR input to the touch screen device through an IR receiver.

12. The non-transitory machine-readable storage medium according to claim 10, further comprising instructions for sensing light in the touch screen device with a photocell sensor.

13. The non-transitory machine-readable storage medium according to claim 10, wherein the server is configured to send feedback from the at least one device to the touch screen device.

14. The non-transitory machine-readable storage medium according to claim 9, wherein the at least one client further comprises at least one of a TV, a personal computer, a personal digital assistant, and a game controller, and
  the plurality of devices comprise at least one of an audio system, a video system, an intercom system, a lighting system, a security system, a link, and a HVAC system.

15. A process of operating an automation system in a Web Service environment, comprising steps of:
  implementing a server, at least one client and a plurality of devices with a Web Services for Devices (WSD) interface, each client configured to control the at least one of the plurality of devices, the plurality of devices grouped into one or more device categories based on functions thereof;
  establishing an Internet Protocol (IP) based network among the server, the at least one client and the plurality of devices;
  enabling communication among the server, the at least one client and the plurality of devices via the IP based network using the WSD interface,
  wherein the WSD interface is configured to establish communication among the server, the at least one client and the plurality of devices regardless of a difference thereamong in at least one of a proprietary language and communication protocol via the IP based network according to a WSD protocol architecture, the WSD protocol architecture comprising:
    a first communication layer configured to logically interface the at least one client;
    a second communication layer configured to physically interface the plurality of devices; and
    a service provider layer stacked between the first and second communication layers and hosting one or more components, each component provided for a particular device category in a one-to-one relationship and hosting one or more Web Services, one or more device bridges and a controller,
    wherein each Web Service is provided for a particular device of the device category corresponding to the component in a one-to-one relationship and configured to function as a Web Service host for the particular device,
    wherein each device bridge is provided for a particular Web Service in a one-to-one relationship and configured to translate communication between the particular Web Service and the particular device corresponding thereto, each device bridge being specific to a specific make of the particular device, and
    wherein the controller is provided for the component in a one-to-one relationship and configured to communicate with the one or more devices of the same device category corresponding to the component and receive feedback from the one or more devices of the corresponding device category to the component.

16. The process of claim 15, wherein the at least one client comprises a touch screen device implemented with a user interface for controlling at least one of the plurality of devices.

17. The process according to claim 16, further comprising the step of receiving a user input to the touch screen device through at least one of:
- a hotspot arranged on a front surface of a housing of the touch screen device, the hotspot configured to activate a predetermined function upon being touched; and
- at least one slider area arranged on an edge portion of the housing, the at least one slider area configured to provide increasing or decreasing activation of a predetermined function responsive to a sliding touch.

18. The process according to claim 17, further comprising the step of generating audio from the touch screen device with at least one speaker.

19. The process according to claim 17, further comprising the step of at least one of:
- receiving IR input to the touch screen device through an IR receiver; and sensing light in the touch screen device with a photocell sensor.

20. The process according to claim 16, wherein the at least one client further comprises at least one of a TV, a personal computer, a personal digital assistant, and a game controller, and the plurality of devices comprise at least one of an audio system, a video system, an intercom system, a lighting system, a security system, a link, and a HVAC system.

* * * * *